United States Patent
Buchal et al.

(10) Patent No.: US 8,365,538 B2
(45) Date of Patent: Feb. 5, 2013

(54) HIGH TEMPERATURE-RESISTANT SEALING ASSEMBLY, ESPECIALLY FOR GAS TURBINES

(75) Inventors: Tobias Buchal, Düsseldorf (DE); Gregor Frank, Essen (DE); Uwe Gruschka, Kaarst (DE); Joachim Krützfeldt, Mülheim an der Ruhr (DE); Kai-Uwe Rogos, Mülheim an der Ruhr (DE); Axel Schaberg, Oelde (DE)

(73) Assignee: Siemens Aktiengesellschaft, München (DE)

( * ) Notice: Subject to any disclaimer, the term of this patent is extended or adjusted under 35 U.S.C. 154(b) by 946 days.

(21) Appl. No.: 11/992,434

(22) PCT Filed: Sep. 20, 2006

(86) PCT No.: PCT/EP2006/066558
§ 371 (c)(1),
(2), (4) Date: Mar. 20, 2008

(87) PCT Pub. No.: WO2007/033974
PCT Pub. Date: Mar. 29, 2007

(65) Prior Publication Data
US 2010/0146985 A1 Jun. 17, 2010

(30) Foreign Application Priority Data
Sep. 22, 2005 (EP) .................................. 05020691

(51) Int. Cl.
*F02C 7/12* (2006.01)
(52) U.S. Cl. ............... 60/800; 60/752; 60/806; 60/754; 415/134

(58) Field of Classification Search .................. 415/134; 60/752, 754, 755, 756, 757, 758, 759, 760, 60/782, 800, 806
See application file for complete search history.

(56) References Cited

U.S. PATENT DOCUMENTS

| 5,400,586 | A | * | 3/1995 | Bagepalli et al. | 60/800 |
| 6,450,762 | B1 | | 9/2002 | Munshi | |
| 6,658,853 | B2 | | 12/2003 | Matsuda et al. | |
| 6,751,962 | B1 | * | 6/2004 | Kuwabara et al. | 60/800 |

FOREIGN PATENT DOCUMENTS

| DE | 10 2004 002 888 A1 | 8/2004 |
| EP | 0 239 020 A2 | 9/1987 |
| EP | 0 616 112 A1 | 9/1994 |
| EP | 1 146 203 A2 | 10/2001 |
| FR | 2 422 037 | 11/1979 |
| GB | 2 303 888 A | 3/1997 |
| JP | 2000257862 A | 9/2000 |

(Continued)

*Primary Examiner* — Ehud Gartenberg
*Assistant Examiner* — Steven Sutherland

(57) ABSTRACT

The invention relates to a high temperature-resistant sealing assembly comprising a sealing segment and a component border which is connected to the sealing segment. A flexible sealing element is provided in order to joining the sealing segment and the component border. The invention is characterized in that the flexible sealing element compensates both thermal expansions and relative movements of the component border and the components resting against the sealing segment. The flexible sealing element and the sealing segment are subject to little wear and have a long service life. The invention further relates to a combustion chamber that is equipped with a high temperature-resistant sealing assembly as well as a gas turbine encompassing such a combustion chamber.

16 Claims, 2 Drawing Sheets

FOREIGN PATENT DOCUMENTS

| | | |
|---|---|---|
| JP | 2003065071 A | 3/2003 |
| JP | 2003083088 A | 3/2003 |
| JP | 2004301115 A | 10/2004 |
| WO | WO 98/16764 | 4/1998 |

* cited by examiner

HIGH TEMPERATURE-RESISTANT SEALING ASSEMBLY, ESPECIALLY FOR GAS TURBINES

CROSS REFERENCE TO RELATED APPLICATIONS

This application is the US National Stage of International Application No. PCT/EP2006/066558, filed Sep. 20, 2006 and claims the benefit thereof. The International Application claims the benefits of European application No. 05020691.1 filed Sep. 22, 2005, both of the applications are incorporated by reference herein in their entirety.

FIELD OF INVENTION

The invention relates to a high temperature-resistant sealing assembly with a sealing segment and a component border which is connected to the sealing segment. The high temperature-resistant sealing assembly is designed for use in a combustion chamber for gas turbines.

BACKGROUND OF THE INVENTION

DE 10 2004 002 888 A1 has a gas turbine end-pipe seal that seals a space between an end pipe and a combustion gas annular space. A hot gas flow, which then flows into the turbine, forms in the annular space. In this case, the annular space has a cross-section which increases in the direction of the turbine (downstream). This reduces the wear in the turbine-encasing housing due to repeated thermal expansion. With regard to the connection between the combustion chamber pipe end and the annular space, DE 10 2004 002 888 A1 discloses a flange for a combustion chamber and a corresponding U-shaped groove for the annular space. To connect the combustion chamber with the annular space, the flange is entered into the groove (plug-in connection). The end of the combustion chamber is connected to the combustion gas annular space by means of an end-pipe seal. In this case, the channel or groove has a U-shaped cross-section in an end section of the end-pipe seal. The flange of the combustion chamber end is inserted into the channel or groove.

JP 2004301115 A also discloses a plug-in system for the connection of the combustion chamber to an annular space. In this case also, a flange or flange-type connection is formed at the combustion chamber pipe end. The annular space also has a groove. The flange is inserted into the groove to connect the combustion chamber to the annular space. In addition, both components are connected to each other by a bolted connection.

With connections, according to the prior art, between the combustion chamber and an adjacent sealing segment, for example an annular space, for the transfer of the hot gas to a turbine, the connections are in the form of meshing sheet-metal designs. These have a groove on the sealing segment and a flange on the combustion chamber pipe end, which are attached by plugging directly into each other. Furthermore, the end of the sealing segment lies in contact with the turbine. The hot gas thus flows from the combustion chamber pipe end via the sealing segment into the turbine. The sheet-metal structure is designed so that slight relative movements of the turbine, which take place in and against the direction of flow of the hot gas, are accommodated. The sheet-metal structure is rigidly connected to the combustion chamber end pipe. The sheet-metal structure and sealing segment shown here are, however, subject to strong thermal and mechanical deformations during operation and therefore to impermissible leaks and high wear. This leads to a shorter service life of the sheet-metal structure and of the sealing segment and consequently to frequent maintenance operations on the sheet-metal structure.

This type of design therefore represents a maintenance-intensive, weak point in the transition area between the combustion chamber pipe end and the turbine inlet and is worthy of improvement.

SUMMARY OF INVENTION

The object of the invention is therefore to provide an improved sealing assembly for high temperatures, especially for the guidance of hot gas, which is characterized by a low tendency to leakage and long service life. The sealing assembly must be useable in a combustion chamber for gas turbines.

This object is achieved by the invention by a high temperature-resistant sealing assembly with a sealing segment and a component border connected to the sealing segment, with a flexible sealing element being provided for the connection between the sealing segment and component border.

The invention is based on the observation that with the sheet-metal design discussed above, the amount of wear is very high due to the relative movements exerted by the connection (plug-in connection) during operation, which leads to substantial deformation and high maintenance intensity due to the low service life of the sealing segment and plug-in connection. The components of the plug-in connection, the flange and the groove, are plugged tightly into each other to attach both components to each other and protect against the egress of hot gas. However, the hot gas causes the joint to deform in that it expands unevenly. With a gas turbine, for example, irregular movements in all directions take place during operation, for instance due to the guide vanes. These relative movements are transmitted to the sealing segment and therefore to the plug-in connections. The components of the plug-in connection expanded by the hot gas and now tightly meshed together thus impermissibly deform due to the relative movement. This occurs because the movement causes the components to foul and press against each other. Very considerable mutual deformation of the components occurs due to the movements and the force thus exerted on the components. Due to the deformation, gaps occur through which the hot gas escapes. The gaps increase the longer the plug-in connection is in operation. This occurs on the one hand because the already deformed components expand during operation. The meshing of the components with each other is then limited and also further deformations take place which increase the already existing gaps. The result is an increasing loss of gas and a deteriorating sealing effect. The sealing segment and the sealing have a reduced service life due to this unsatisfactory interaction.

Based on the knowledge of this cause and effect relationship of sealing design according to the prior art, the inventive high temperature-resistant sealing assembly now substantially increases the service life of the seal and an associated sealing segment, for example an annular space. This is achieved by a flexible sealing element fitted between the component outlet section, for example a combustion chamber outlet section, and a sealing element. The sealing element is of flexible design and is so arranged that it compensates for relative movements and thermal expansion. Because of the use of a flexible sealing element, the sealing segment and the component outlet section do not form a rigid connection, such as is used in the plug-in system according to the prior art. The undesirable deformation of the sealing element and associated, impermissible deformation of the sealing segment are effectively counteracted by the flexible connection. Leakages are largely avoided due to this reduced deformation. The flexible sealing element therefore on one hand fulfills the function of accommodating movements in the form of thermal expansion or relative movements, for example due to the turbine, and on the other hand provides the sealing function. Wear of the sealing segment and of the connection of the sealing segment to the component outlet section is reduced by the flexible seal assembly. A longer service life thus results. The consequences is longer maintenance intervals than hitherto.

The flexible sealing element is preferably fitted to a side facing away from the hot gas both on the sealing segment and on the component border. For this purpose, a flange is, for example, provided on a side of the component border facing away from the hot gas, to which the sealing element is attached. This means that the sealing element is protected against direct impact by the hot gas. The danger of material damage, such as can occur due to hot gas, is therefore reduced.

In a preferred embodiment, the sealing element has a wall through which a number of channels pass. The purpose of these channels is to cool the sealing segment with a cooling medium. The sealing segment is therefore effectively protected from the hot gas operating temperatures and also from the effect of material damage. The number and arrangement of cooling channels in the wall are advantageously matched to the particular cooling task.

The wall itself is preferably cooled by impact cooling, with an impact cooling device being provided for this purpose. The impact cooling reduces the temperature of the sealing element in that a part of the heat is dissipated to the cooling medium, which impacts the wall at high pressure. This also provides an additional protection against high hot gas temperatures, thus resulting in an extension of the service life.

In a preferred embodiment, the component border is a combustion chamber outlet section. This is designed for the guidance of hot gas. This configuration of the high temperature-resistant sealing assembly is particularly effective. In a combustion chamber, hot gases are formed that can be conveyed with comparatively low hot gas loss due to the high temperature-resistant sealing assembly.

The flexible sealing element is preferably arranged downstream of the combustion chamber outlet section in the direction of flow of the hot combustion gas. The sealing element in this arrangement is well placed to absorb the movements of the adjacent components.

In a further preferred embodiment, the sealing segment is designed to connect the combustion chamber outlet section to a turbine downstream of the combustion chamber. The hot gas is thus preferably passed from the combustion chamber via this connection to a turbine. The hot gas flowing through the turbine is used for energy generation.

Preferably, the sealing segment forms an annular space. In this annular space, the hot gas generated in the combustion chamber is passed to the turbine. The hot gases emerging from the combustion chamber outlet section mix in this annular space and form a hot gas flow that is mixed into an essential homogenous mixture and thus improved. This results in a homogenous and defined inflow to the turbine inlet with the first series of guide vanes.

In a further preferred embodiment, the sealing element is made of metal or a metal alloy. Metals or metal alloys are one hand temperature resistant and on the other hand have a spring-elastic component which makes them particularly suitable for this type of application.

The flexible sealing element is preferably designed as an E-seal, a dog-bone seal or as a brush shape. In this arrangement, the sealing element can well absorb, and compensate for, thermal and mechanical movements, because with this type of seal the spring-elastic component is very high.

The high temperature-resistant sealing assembly is preferably provided in a combustion chamber. In this case it can, for example, be a can, can-annular or annular combustion chamber, as are provided in gas turbines.

BRIEF DESCRIPTION OF THE DRAWINGS

The invention is explained in more detail in the following with the aid of drawings.

These drawings, as follows, are simplified and are not to scale.

The same reference characters are used in all the figures for parts that are the same.

DETAILED DESCRIPTION OF INVENTION

Figure 1:
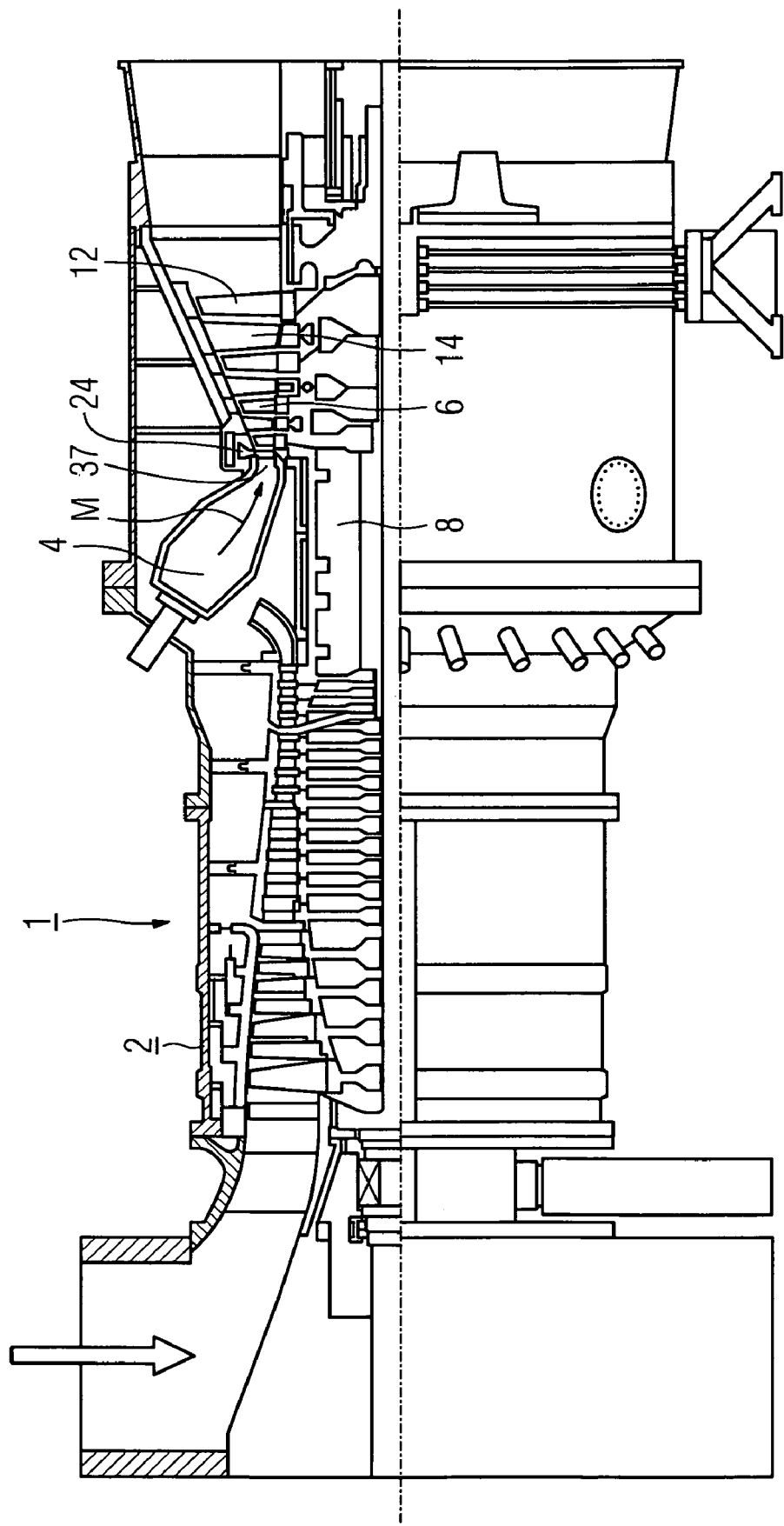
FIG. 1 shows a schematic representation of a gas turbine.

The gas turbine 1 according to FIG. 1 has a compressor 2 for combustion air, a combustion chamber 4, a turbine 6 to drive the compressor 2 and a generator or working machine (not illustrated in more detail), and an annular space 24 for transferring the hot gas M from the combustion chamber 4 to the turbine 6. Inlet air L is compressed in the compressor 4. For this purpose, the turbine 6 and the compressor 2 are mounted on a turbine shaft 8, also known as a turbine rotor, which also connects the generator or working machine and which is rotatably mounted about its center axis. The turbine 6 has a number of rotating rotor blades 12 connected to the turbine shaft 8. The rotor blades 12 are arranged as an annulus on the turbine shaft 8 and thus form a number of rows of rotor blades. Furthermore, the turbine 6 has a number of fixed guide vanes 14. The rotor blades 12 are used to drive the turbine shaft 8 by transmitting the impulse of the hot medium, the working medium, e.g. the hot gas M, flowing through the turbine 6. The guide vanes 14 on the other hand are used to guide the flow of the working medium, for example of the hot gas M.

The hot gas M, for example generated in the combustion chamber 4, flows in the direction of flow 38 from the combustion chamber 4 through an annular space 24 to the turbine 6. An essentially homogenously mixed flow of the working medium, for example a hot gas M, forms in the annular space 24. The combustion chamber 4 in this case has a combustion chamber outlet section 37. When the turbine 6 and combustion chamber 4 are operating, mechanical relative movements and thermal expansions of the components occur, which are felt particularly in the area of the joint between the combustion chamber 4 and turbine 6, i.e. the annular space 24.

Figure 2:
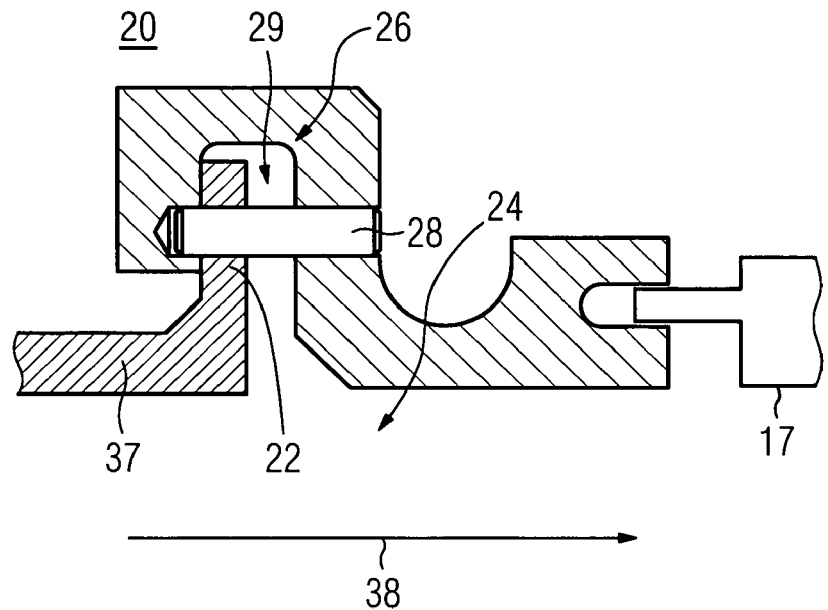
FIG. 2 shows an annular space with a seal assembly according to the prior art.

FIG. 2 shows an example of a conventional sealing assembly as is used in gas turbines 1 to seal the annular space 24. In this case, it is a plug-in system 20 consisting of a combustion chamber outlet section 37 and a turbine inlet section 17, and an annular space 24 for transfer of the hot gas M, generated in the combustion chamber 4, to the turbine 6. To attach the annular space 24 to the combustion chamber outlet section 37, a flange 22 is formed on the combustion chamber outlet section 37. The annular space 24 has a U-shaped groove 26 corresponding to the flange 22. The flange 22 is entered into the groove 26. To attach and secure the groove 26 to the flange 22, the flange 22 and the groove 26 are provided with an attaching pin 28. A cavity 29 is provided between the flange 22 and the groove 26 to enable a certain thermal expansion during operation. However, the attaching pin 28 and the arrangement of the flange 22 in the groove 26 on their own enable only a slight thermal expansion. Furthermore, this rigid and fixed connection prevents expansion in all directions. The effect of this is that, due to the relative movement and thermal expansion, there is an increase in wear and in deformation and consequently a reduction in the service life of the annular space 24 and of the connection of the annular space 24 to the combustion chamber outlet section 37.

Figure 3:
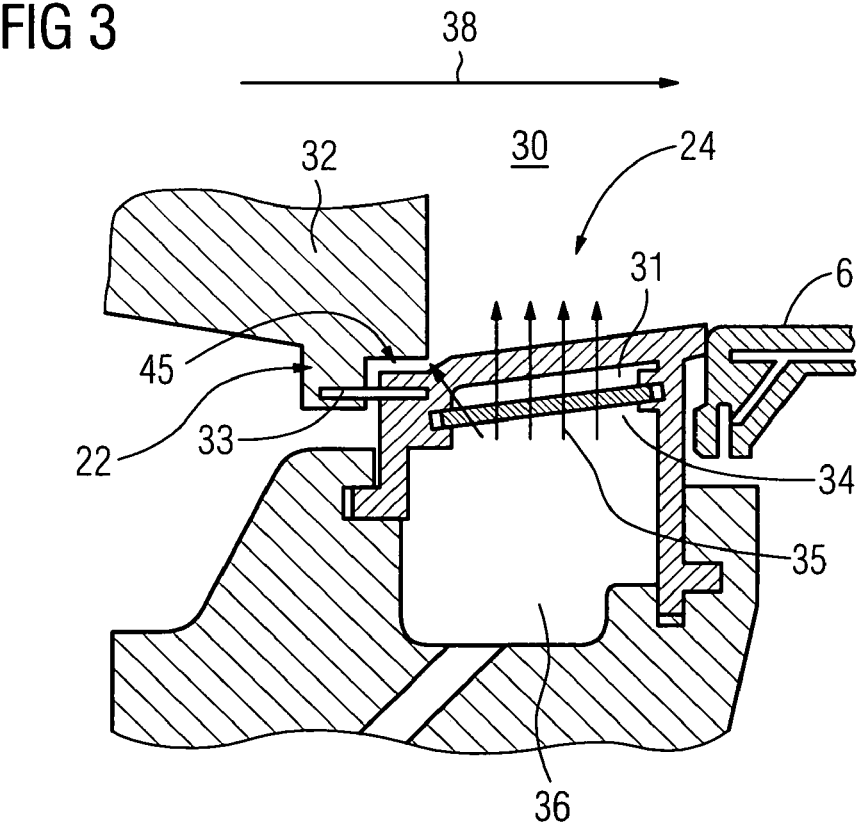
FIG. 3 A high temperature-resistant sealing assembly according to the invention.

FIG. 3, on the other hand, shows a high temperature-resistant sealing assembly 30 according to the invention. This has a sealing segment 31 and a component border 32 connected to the sealing segment 31. The component border 32 is connected to the sealing segment 31 by a flexible sealing element 33. The high temperature-resistant sealing assembly 30 is thus designed to guide hot gas M. The flexible sealing element 33 is preferably made of a metal alloy or of metal. It is thus temperature resistant. At the same time it has a spring-elastic component. The sealing element 33 is preferred as an E-seal, dog-bone seal or brush-shaped seal. This increases the spring-elastic component of the sealing element 33. The sealing element 33, for example, absorbs the strong movements generated by the turbine 6 and compensates for same. At the same time, it absorbs the movements due to the thermal expansion of adjacent components. The flexible sealing element thus allows movement of all the adjacent components in all directions. The effects of this are a reduction in leakage of the connection of the sealing elements 31 to the component border, especially the combustion chamber outlet section.

To attach the flexible sealing element 33 to the component border 32, a flange 22, which faces away from the gas side, is fitted to the component border 32. The sealing segment 31 is fitted in such a way that the component border 32 overlaps a part of the sealing segment 31. The flexible sealing element 33 is fitted to the flange on the side of the sealing segment 31, in this overlap.

The sealing element 33 is therefore protected from direct impact by the hot gas. The sealing segment 31 also has a wall 34 through which a number of cooling channels 35 have been pierced. The cooling medium pass through these cooling channels to the hot gas side and thus cools the sealing segment 31. The sealing segment 31 is thus protected against the hot gas M. To provide further protection to the flexible sealing element 33 against hot gas M, one or more cooling channels 35 are provided so that the outflowing cooling medium prevents penetration of the hot gas M into a gap 45, which is formed between the sealing segment 31 and the component border 32 partly overlapping the sealing segment. This also increases the effectiveness of the cooling of the flexible sealing element 33. The cooling medium is applied by an impact cooling device 36. With the impact cooling device 36, the cooling medium strikes the wall 34 under pressure, essentially vertically. This causes a temperature exchange to take place between the wall 34 and the cooling medium. This efficient cooling method reduces the temperature of the sealing segment 31. The sealing segment 31 forms an annular space 24. An essentially homogenous mixing of the hot gas and formation of a hot gas flow take place in this space. Furthermore, the sealing element 33 is downstream of the component border 32. The turbine 6 and sealing segment 31 components are in contact with each other. Turbine movements are thus transmitted to the sealing segment 31. These movements and the thermal expansion that occur are compensated for by the flexible sealing element 33, thus significantly increasing the service life.

A further advantage is the essentially simpler assembly and dismantling of the sealing segment 31 compared, for example, with a plug-in system, due to the simpler design.

The invention is in principle a recognition of the reduction in the service life of a sealing segment, which is arranged in a gas turbine between a combustion chamber outlet and a turbine, mainly due to the relative movements of the turbine and the thermal expansion in the joint, with deformation occurring due to the hot gas. The appropriate compensation for this disadvantageous deformation achieved by a flexible sealing element, which connects the combustion chamber outlet and the sealing segment, has a direct favorable effect on the service life of the sealing element and of the sealing segment. The contribution of the invention to high temperature-resistant sealing assemblies, especially those used in a gas turbine, therefore represents a great advantage compared with conventional sealing assemblies and provides a substantial improvement compared with the plug-in systems normally used.

The invention claimed is:

1. A high temperature-resistant sealing assembly for a combustion chamber, comprising:
    a flexible sealing element; and
    a sealing segment connected to a component border of the combustion chamber by the flexible sealing element,
    wherein the sealing segment is constructed and arranged to guide a hot gas in a generally axial direction,
    wherein a flange facing away from the hot gas is fitted to the component border, wherein a portion of the sealing segment overlaps a portion of the component border, the flexible sealing element being oriented in an axial direction and fitted to the flange and to a side of the sealing segment facing away from the hot gas, in this overlap, and
    wherein the sealing segment has a wall with a plurality of channels penetrating the wall for allowing flow of a cooling medium therethrough, wherein the channels are oriented so as to direct outflowing cooling medium prevent penetration of the hot gas into a space defined by the overlapping portions of the component border and the sealing segment.

2. The high temperature-resistant sealing assembly as claimed in claim 1, wherein an impact cooling device is provided for impact cooling of the wall.

3. The high temperature-resistant sealing assembly as claimed in claim 2, wherein the component border is a combustion chamber outlet section that guides a hot combustion gas.

4. The high temperature-resistant sealing assembly as claimed in claim 3, wherein the sealing segment is arranged downstream of the combustion chamber outlet section in the direction of flow of the hot combustion gas.

5. The high temperature-resistant sealing assembly as claimed in claim 4, wherein the sealing segment connects the combustion chamber outlet section to a turbine downstream of the combustion chamber.

6. The high temperature-resistant sealing assembly as claimed in claim 5, wherein the sealing segment forms an annular space.

7. The high temperature-resistant sealing assembly as claimed in claim 6, wherein the sealing element is made of metal or a metal alloy.

8. The high temperature-resistant sealing assembly as claimed in claim 7, wherein the sealing element is an E-seal, a dog-bone seal or a brush-shaped seal.

9. A gas turbine engine, comprising:
a rotor arranged along a rotational axis of the engine;
a compressor arranged coaxial with the rotor that produces a compressed working medium;
a combustion chamber arranged downstream of the compressor that receives the compressed working medium, where the combustion chamber has a component border and a high temperature-resistant sealing assembly, and
a turbine that receives and expands the hot gas,
wherein the combustion chamber comprises:
- a flexible sealing element; and
- a sealing segment connected to the component border by the flexible sealing element,
- wherein the sealing segment guides a hot gas produced by the combustion chamber along a generally axial direction from the combustion chamber to the turbine,
- wherein a flange facing away from the hot gas is fitted to the component border, wherein a portion of the sealing segment overlaps a portion of the component border, the flexible sealing element being oriented in an axial direction and fitted to the flange and to a side of the sealing segment facing away from the hot gas, in this overlap, and
wherein the sealing segment has a wall with a plurality of channels penetrating the wall for allowing flow of a cooling medium therethrough, wherein the channels are oriented so as to direct outflowing cooling medium to prevent penetration of the hot gas into a space defined by the radially overlapping portions of the component border and the sealing segment.

10. The gas turbine engine as claimed in claim 9, wherein an impact cooling device is provided for impact cooling of the wall.

11. The gas turbine engine as claimed in claim 10, wherein the component border is a combustion chamber outlet section that guides a hot combustion gas.

12. The gas turbine engine as claimed in claim 11, wherein the sealing segment is arranged downstream of the combustion chamber outlet section in the direction of flow of the hot combustion gas.

13. The high gas turbine engine as claimed in claim 12, wherein the sealing segment connects the combustion chamber outlet section to a turbine downstream of the combustion chamber.

14. The gas turbine engine as claimed in claim 13, wherein the sealing segment forms an annular space.

15. The gas turbine engine as claimed in claim 14, wherein the sealing element is made of metal or a metal alloy.

16. The gas turbine engine as claimed in claim 15, wherein the sealing element is an E-seal, a dog-bone seal or a brush-shaped seal.

* * * * *